United States Patent [19]

Moseman

[11] 4,387,593
[45] Jun. 14, 1983

[54] POWDER LEVEL MEASUREMENT PROBE

[75] Inventor: Merlin H. Moseman, Omaha, Nebr.

[73] Assignee: InterNorth, Inc., Omaha, Nebr.

[21] Appl. No.: 235,851

[22] Filed: Feb. 19, 1981

[51] Int. Cl.³ ............................................. G08B 21/00
[52] U.S. Cl. .............................. 73/290 R; 73/DIG. 5;
340/617
[58] Field of Search .................. 340/617, 686; 33/126,
33/126.7 A; 73/290 R, DIG. 5; 307/118

[56] References Cited

U.S. PATENT DOCUMENTS

| | | | |
|---|---|---|---|
| 2,774,959 | 12/1956 | Edelman | 340/617 |
| 3,454,869 | 7/1969 | Strauss | 340/686 |
| 3,514,627 | 5/1970 | Bridgeman | 340/686 |
| 3,565,402 | 2/1971 | Linke | 340/686 |
| 3,896,280 | 7/1975 | Blake | 340/686 |
| 4,058,792 | 11/1977 | Stoltesz | 340/686 |
| 4,103,292 | 7/1978 | Haas | 340/617 |
| 4,191,951 | 3/1980 | Fuzzell | 340/617 |

Primary Examiner—E. R. Kazenske
Assistant Examiner—D. Corr
Attorney, Agent, or Firm—Zarley, McKee, Thomte, Voorhees & Sease

[57] ABSTRACT

A powder level measurement probe is described for use in a polypropylene gas phase reactor. The apparatus comprises a support tube which extends downwardly from the upper end of the reactor and which has a non-metallic powder probe holder mounted on the lower end thereof. The holder is provided with upper and lower recessed areas formed therein. A metal proximity sensor is positioned in the upper recessed area and is operatively connected to a signal device such as a light or the like which is positioned remote from the reactor. A metal plate is movably positioned in the lower recessed area of the holder and has a probe secured thereto which extends downwardly therefrom which is adapted to be engaged by the powder within the reactor. Movement of the probe by the powder causes the metal proximity sensor to be activated which in turn activates the signal device connected thereto.

6 Claims, 3 Drawing Figures

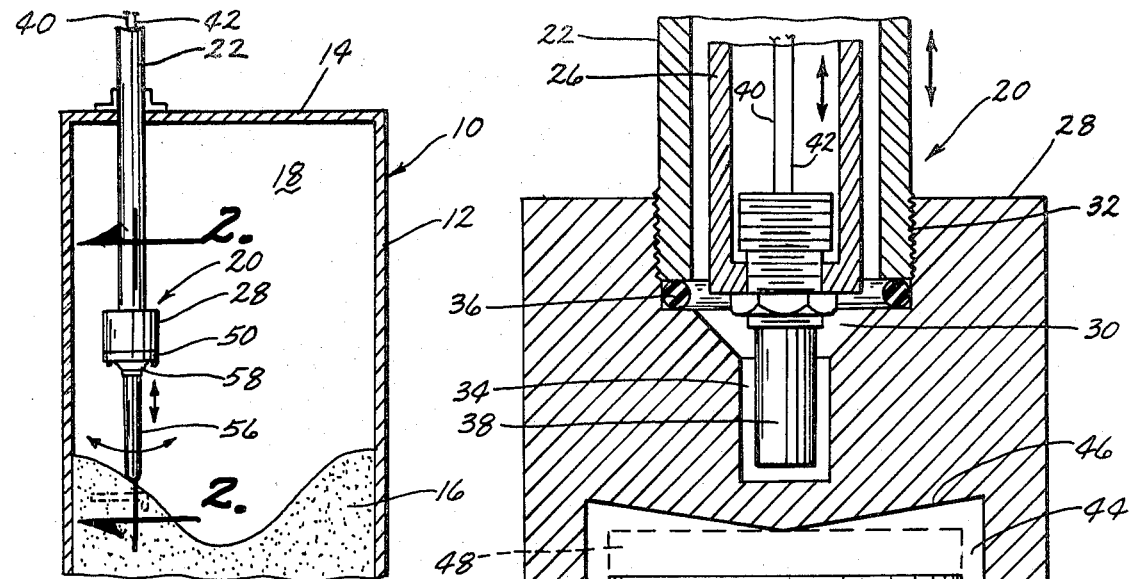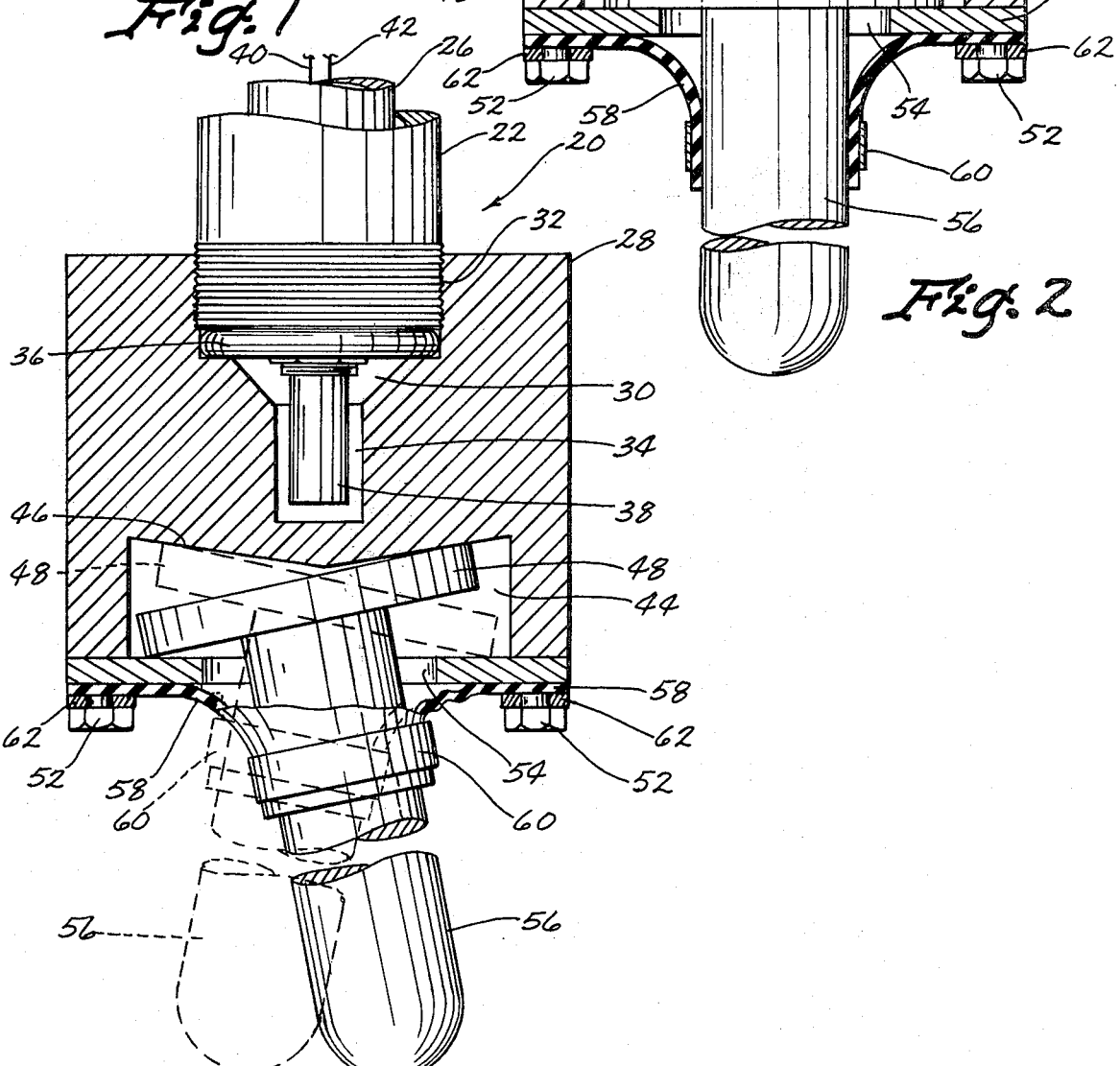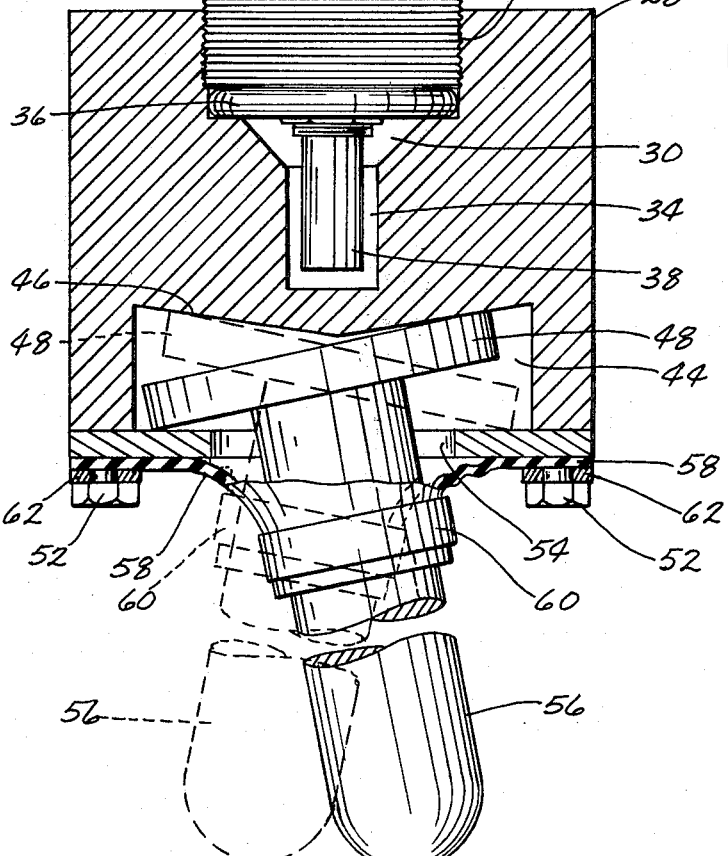

POWDER LEVEL MEASUREMENT PROBE

BACKGROUND OF THE INVENTION

This invention relates to a powder level measurement probe and more particularly to a powder level measurement probe which permits the measurement of powder depth in a high pressure, reactive gas-filled, polypropylene gas phase reactor.

The level of polypropylene powder in a stirred gas phase reactor is critical for optimum product quality. Measurement of the powder level within the reactor is extremely difficult due to several reactor characteristics. A reactor pressure of approximately 450 psi together with an operating temperature of 185° F. eliminates the possibility of being able to use commercial bin powder level measurement devices. Additionally, the reactor walls are approximately $2\frac{1}{8}$ inches thick with an outer steel jacket for steam heating. A further problem associated with the measurement of the powder level within the reactor is that the powder in the reactor is mechanically stirred by a helical screw which precludes access to any level measurement from the sides. Further, the pressure of the gas phase above the powder greatly reduces the effective density difference between the phases.

The physical restraints enumerated above eliminate the use of practically all commercially available devices for powder level measurement. Currently, the most popular type of instrumentation is of the nuclear type but the nuclear type devices suffer from accuracy limitations.

Therefore, it is a principal object of the invention to provide a powder level measurement probe for a polypropylene gas phase reactor.

A further object of the invention is to provide a powder level measurement probe for a polypropylene gas phase reactor which is durable.

A still further object of the invention is to provide a powder level measurement probe for a polypropylene gas phase reactor which includes means for sealing the interior thereof from the reactor.

A still further object of the invention is to provide a powder level measurement probe for a polypropylene gas phase reactor which is extremely accurate.

These and other objects will be apparent to those skilled in the art.

BRIEF DESCRIPTION OF THE DRAWINGS

FIG. 1 is a sectional view of a polypropylene gas phase reactor having the powder level measurement probe of this invention mounted therein:

FIG. 2 is an enlarged sectional view taken on lines 2—2 of FIG. 1; and

FIG. 3 is a sectional view similar to FIG. 2 except that the probe is illustrated in its various pivoted positions.

SUMMARY OF THE INVENTION

A powder level measurement probe for a polypropylene gas phase reactor is disclosed comprising a support tube means secured to the upper end of the reactor and extending downwardly into the interior of the reactor. The tube means comprises inner and outer tubes which are vertically adjustably mounted with respect to the reactor. A non-metallic probe holder is threadably mounted on the lower end of the outer tube and has an upper recessed area formed therein which receives a metal proximity sensor which is connected to a signal device located remotely of the reactor. A flat metal plate is movably mounted in the lower recessed area in the holder and has a probe secured thereto which extends downwardly therefrom for contact with the powder in the reactor. A flexible gasket embraces the probe and the lower end of the holder to seal the interior of the lower recessed area from the interior of the reactor. Movement of the probe by the powder within the reactor causes the metal plate to move towards the metal proximity sensor thereby activating the same.

DESCRIPTION OF THE PREFERRED EMBODIMENT

The numeral 10 in FIG. 1 schematically represents a polypropylene gas phase reactor having side walls 12 which are normally $2\frac{1}{8}$ inches thick and a top portion 14 which may be comprised of a lid or the like. The numeral 16 refers to the polypropylene powder while the area 18 refers to that area within the reactor which would normally be approximately 185° F. and having a pressure of approximately 450 psi.

The numeral 20 refers generally to the powder level measurement probe of this invention comprising generally a powder level probe support tube 22 which extends downwardly through the top 14 of the reactor 10. Support tube 22 is selectively vertically adjustable with respect to the reactor 10 by any convenient means such as a flanged clamping arrangement 24. A proximity sensor support tube 26 is positioned within the tube 22 and is also vertically adjustably mounted therein by any convenient means.

A non-metallic powder probe holder 28 is threadably mounted on the lower end of the tube 22 as best seen in FIG. 2. Holder 28 is provided with a recessed portion 30 at its upper end including internal threads 32. The lower end of recessed portion 30 defines a cylindrical portion 34. The lower end of tube 22 is threadably secured to the holder 28 in the manner depicted in FIG. 2 with the O-ring 36 being compressed below the lower end of the tube 22 so that the interior of recessed area 30 is sealed from the interior of the reactor 10.

The numeral 38 refers to a conventional metal proximity sensor which is threadably mounted in the lower end of the tube 26 so that the lower end of the sensor 38 is received by the cylindrical recessed portion 34. The sensor 38 is selectively vertically adjustably mounted in the tube 26 to enable the sensor 38 to be raised or lowered as desired. Leads 40 and 42 extend from the sensor 38 upwardly through the tube 26 to the sensor electronics and a signal means such as a light or the like located remotely from the reactor 10.

The lower end of holder 28 is provided with a recessed portion 44 having a conical-shaped upper end portion 46. A disc-shaped metal plate 48 is positioned within the recessed area 44 and is maintained therein by means of the support ring 50 secured to the lower end of the holder 28 by the screws 52. Support ring 50 has a central opening 54 formed therein through which extends the probe 56 which is rigidly secured at its upper end to the plate 48. Preferably, probe 56 is approximately 12 inches long. A flexible gasket 58 is clamped onto probe 56 by clamp 60 and has its upper peripheral edge positioned between the support ring 50 and the gasket support ring 62 which is held in place by the screws 52. The gasket 58 is flexible and permits the probe 56 to pivot to the positions illustrated in FIG. 3 while sealing the interior recessed portion 44 to prevent the powder in the reactor from entering the recessed portion 44 from the interior of the reactor. The gasket is vented to allow the high pressure gas phase to equalize the pressure on both sides of the gasket. The gasket 58 is flexible and permits the probe 56 to pivot to the positions illustrated in FIG. 3 while sealing the interior of recessed portion 44 from the movement of powder from the interior of the reactor 10.

In use, an apparatus of the invention was designed wherein the probe 56 was comprised of a phenolic material approximately 12 inches long and ¾ inch diameter. The proximity sensor 38 was purchased from Delavan and designated as Model P001S. The holder 28 is preferably comprised of a polypropylene, nylon, phenolic, etc. type material. The probe 56 is normally in the position illustrated in FIG. 2 until the powder 16 moves into contact with the probe to move the probe vertically to the position illustrated by broken lines in FIG. 2 or to tilt the probe to the position illustrated by broken lines in FIG. 3. The probe is permitted substantially unrestricted movement so that it will accurately sense the powder level within the reactor. When the plate 48 is raised to the position illustrated by broken lines in FIG. 2 or tilted to either of the positions illustrated in FIG. 3, the sensor 38 will sense the metal of the plate 48 and will be activated so that the signal device located remotely of the reactor will be activated.

The unique means of mounting the probe in the holder and the means for sealing the interior of the holder from the high pressure and temperature within the reactor insures that the device will accurately sense the level of powder within the reactor.

Thus it can be seen that the invention accomplishes at least all of its stated objectives.

I claim:

1. In combination,
    a polypropylene gas phase reactor having an upper end and adapted to contain polypropylene powder therein,
    a rigid hollow tube means extending downwardly into said reactor from the upper end thereof,
    a powder probe holder mounted on the lower end of said hollow tube means and having upper and lower ends,
    said holder having a cylindrical recess formed in its upper end,
    a metal proximity sensor element in said cylindrical recess in said holder and being operatively connected to a signal device remotely from said reactor,
    said holder having a recessed area formed in its lower end spaced below said cylindrical recess and positioned below said sensor element,
    a metal plate means vertically movable mounted and pivotally movably mounted in said recessed area,
    and a rigid powder probe rigidly connected to said plate means and extending downwardly therefrom for contact with the powder in the reactor,
    said metal plate means being either vertically moved or pivotally moved towards said sensor element, to activate the same, when the powder in said reactor sufficiently moves said probe with respect to said holder,
    said recessed area having a circular cross-section and said plate means is disc-shaped and has a smaller diameter than said recessed area; and
    a support ring secured to the lower end of said holder below said plate means to maintain said plate means in said recessed area, said support ring having a central opening smaller in diameter than said plate means and said probe extending downwardly through said support ring.

2. The combination of claim 1 wherein a flexible sealing gasket means is secured to said support ring and said probe for preventing particulate material from entering said recessed area from the interior of said reactor.

3. The combination of claim 1 wherein said hollow tube means comprises an outer tube secured to the upper end of said reactor and an inner tube positioned within said outer tube, said inner tube being selectively vertically movably mounted within said outer tube, said sensor element being secured to the lower end of said inner tube.

4. The combination of claim 2 wherein said gasket is vented to permit the equalization of pressure on opposite sides of said gasket.

5. A particulate material sensing device comprising,
    a vertically disposed rigid support means having upper and lower ends,
    a probe holder mounted on the lower end of said support means and having upper and lower recessed portions formed therein,
    a metal proximity sensor element in said upper recessed portion operatively connected to a remotely located signal device,
    a circular metal member vertically and pivotally movably mounted in said lower recessed portion and being spaced from said sensor element,
    and a probe rigidly connected to said metal member and extending downwardly therefrom for contact with the particulate material,
    said metal member being moved, either vertically or pivotally, towards said sensor element, to activate the same, when the material being sensed moves said probe a predetermined amount relative to said holder
    said lower recessed portion having circular cross-section, said circular metal member is disc-shaped and has a smaller diameter than said lower recessed portion; and
    a support ring secured to the lower end of said probe holder below said circular metal member to maintain said metal member in said lower recessed portion, said support ring having a central opening smaller in diameter than said circular metal member, and said probe extending downwardly through said support ring.

6. The device of claim 5 wherein a flexible gasket embraces said probe and is secured to said probe holder for preventing the particulate material from entering said lower recessed portion.

* * * * *